United States Patent
Baba (10) Patent No.: US 10,104,243 B2
(45) Date of Patent: Oct. 16, 2018

(54) IMAGE FORMING APPARATUS, IMAGE FORMING SYSTEM, AND IMAGE FORMING METHOD

(71) Applicant: FUJI XEROX Co., Ltd., Tokyo (JP)

(72) Inventor: Motofumi Baba, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 45 days.

(21) Appl. No.: 15/042,401

(22) Filed: Feb. 12, 2016

(65) Prior Publication Data

US 2017/0048403 A1    Feb. 16, 2017

(30) Foreign Application Priority Data

Aug. 12, 2015  (JP) .................. 2015-159370

(51) Int. Cl.
   *H04N 1/00*    (2006.01)
   *B64C 39/02*   (2006.01)
   *B64F 1/36*    (2017.01)

(52) U.S. Cl.
   CPC ....... *H04N 1/00127* (2013.01); *B64C 39/024* (2013.01); *B64F 1/36* (2013.01); *H04N 1/00251* (2013.01); *H04N 1/00559* (2013.01); *B60L 2230/16* (2013.01); *B60L 2230/40* (2013.01); *B60L 2240/70* (2013.01); *B64C 2201/027* (2013.01); *B64C 2201/123* (2013.01); *H04N 2201/006* (2013.01); *H04N 2201/0039* (2013.01); *H04N 2201/0055* (2013.01); *H04N 2201/0094* (2013.01); *Y02T 10/7088* (2013.01); *Y02T 10/7291* (2013.01); *Y02T 90/128* (2013.01); *Y02T 90/16* (2013.01); *Y02T 90/163* (2013.01)

(58) Field of Classification Search
   USPC ....................................................... 358/1.14
   See application file for complete search history.

(56) References Cited

U.S. PATENT DOCUMENTS

| 2015/0237227 | A1* | 8/2015  | Saisho   | ........... H04N 1/00875 348/77 |
| 2016/0039541 | A1* | 2/2016  | Beardsley | ......... B60L 11/1816 701/2 |
| 2016/0376004 | A1* | 12/2016 | Claridge  | ............... B64C 19/00 701/3 |

FOREIGN PATENT DOCUMENTS

JP    2007-112315 A    5/2007

* cited by examiner

*Primary Examiner* — Neil R McLean
*Assistant Examiner* — Darryl V Dottin
(74) *Attorney, Agent, or Firm* — Sughrue Mion, PLLC (57) ABSTRACT

An image forming apparatus includes an image forming unit that forms an image on a recording material, a landing pad unit that an unmanned flying device lands on after a flight thereof, and an information exchanging unit that exchanges information with the unmanned flying device landed on the landing pad unit.

21 Claims, 4 Drawing Sheets

IMAGE FORMING APPARATUS, IMAGE FORMING SYSTEM, AND IMAGE FORMING METHOD

CROSS-REFERENCE TO RELATED APPLICATIONS

This application is based on and claims priority under 35 USC 119 from Japanese Patent Application No. 2015-159370 filed Aug. 12, 2015.

BACKGROUND (i) Technical Field

The present invention relates to an image forming apparatus, an image forming system, and an image forming method.

(ii) Related Art

Techniques of using unmanned flying devices to transport goods and monitor a damage situation in a disaster area have been disclosed. Unmanned flying devices are being currently introduced in operations involving risk, such as inspecting a dam or a bridge. In such a case, the unmanned flying device typically returns back to a start position after taking a route indicated by a user in advance or flying outdoors in a remote control operation. Recharging a power supply or exchanging of information with the unmanned flying device is then performed using a charger or a communication device.

SUMMARY

According to an aspect of the invention, there is provided an image forming apparatus. The image forming apparatus includes an image forming unit that forms an image on a recording material, a landing pad unit that an unmanned flying device lands on after a flight thereof, and an information exchanging unit that exchanges information with the unmanned flying device landed on the landing pad unit.

BRIEF DESCRIPTION OF THE DRAWINGS

Exemplary embodiments of the present invention will be described in detail based on the following figures, wherein.

DETAILED DESCRIPTION

Exemplary embodiments are described with reference to the drawing.

Figure 1:
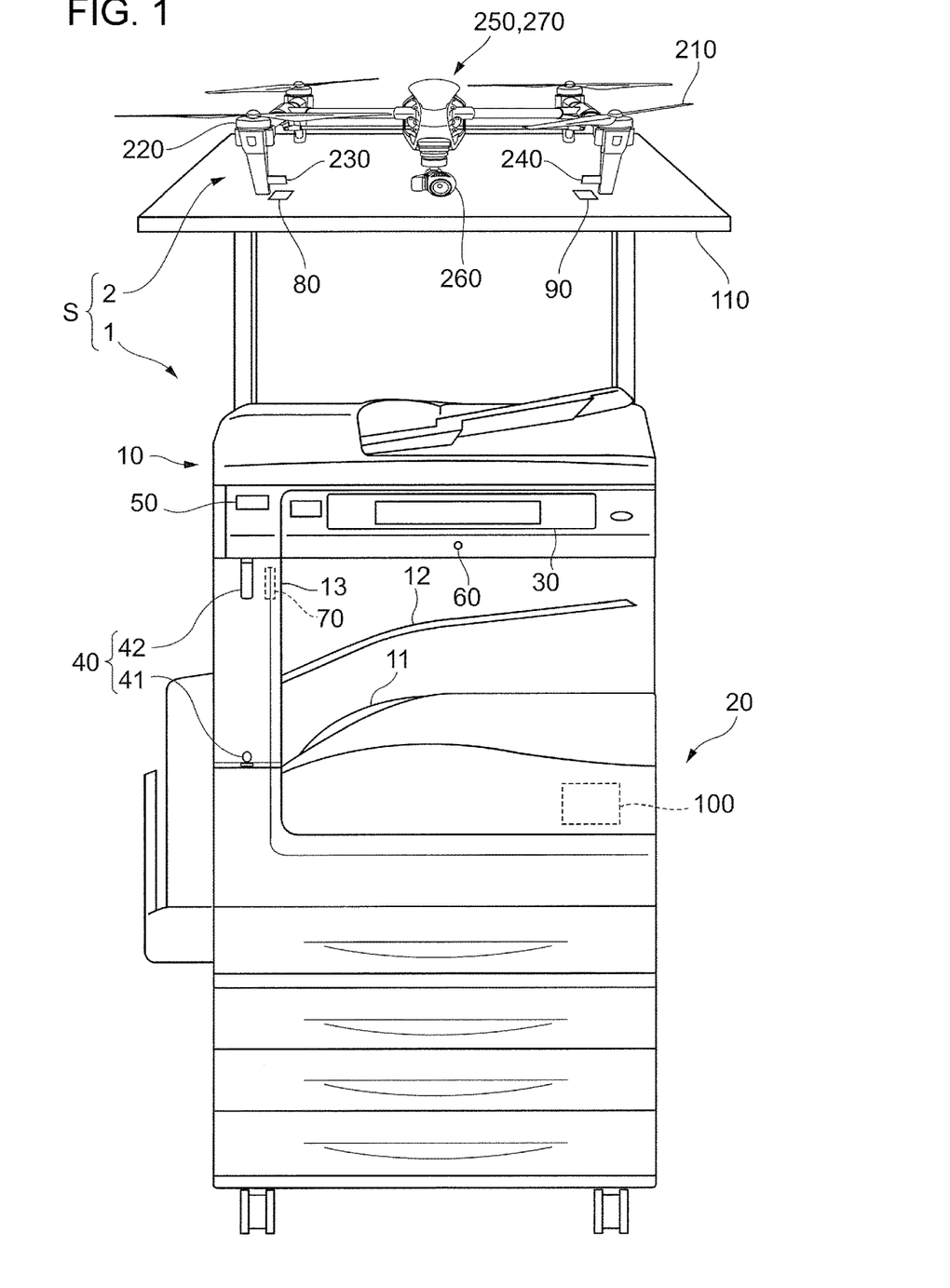
FIG. 1 is an external view illustrating an image forming system of an exemplary embodiment.

FIG. 1 is an external view illustrating an image forming system S of an exemplary embodiment.

The image forming system S of the exemplary embodiment includes an image forming apparatus 1 that forms an image on a recording material (such as a paper sheet or a recording medium), and a drone 2 as an example of an unmanned flying device.

The image forming apparatus 1 includes an image reading device 10 that reads an image of an original document, and an image recording device 20 that forms an image on a paper sheet. The image forming apparatus 1 further includes a user interface (UI) 30 that receives an operational input from a user or displays a variety of information to the user.

The image forming apparatus 1 further includes a human detection sensor 40 that detects the presence of a person, a camera 50 that photographs the surroundings of the image forming apparatus 1, a microphone 60 that picks up a sound, and a loudspeaker 70 that outputs a sound.

The image forming apparatus 1 further includes an information exchanging unit 80 that exchanges information with the drone 2, and a power source unit 90 that supplies power to the drone 2. The image forming apparatus 1 further includes a control device 100 that controls a general process of the image forming apparatus 1, and a landing pad unit 110 on which the drone 2 having completed a flight thereof lands.

The image reading device 10 is disposed in the top portion of the image forming apparatus 1, and the image recording device 20 is disposed below the image reading device 10. The image forming apparatus 1 includes the control device 100. A user interface 30 is disposed in the top front portion of the image forming apparatus 1.

The human detection sensor 40 is disposed in the front portion of a reading device support 13 that supports the image reading device 10. The camera 50 is disposed to the left of the user interface 30, and the microphone 60 is disposed in the front portion of the user interface 30. The loudspeaker 70 is disposed to the left of the reading device support 13.

The landing pad unit 110 is disposed above the image reading device 10. The information exchanging unit 80 and the power source unit 90 are arranged on the top side of the landing pad unit 110 facing the landed drone 2.

The image reading device 10 is an image information reading mechanism configured to read image information, and reads an image recorded on an original document. The image reading device 10 is a scanner, for example.

The image reading device 10 includes a reading module that transmits image data to the image recording device 20, and an original document transport module that picks up documents from a loaded document bundle one by one and then transports the documents successively to the reading module.

The reading module includes a platen glass on which each document is placed, a light source that emits a light beam onto the document on the platen glass, a line sensor that receives a light beam reflected from the original document with plural photo-detectors and generates image information, a reflecting mirror that guides the light beam reflected from the original light to the line sensor, and an optical focusing system that focuses the light beam reflected from the original light and guided by the reflecting mirror onto the line sensor.

The original document transport module is an automatic document feeder (ADF), for example. The original document transport module includes an original document tray that receives the document bundle including plural documents, and a discharge tray that is arranged below the original document tray and receives the original documents having undergone the reading operation. The original document transport module also includes paper transport rollers that take the original documents from the original document tray, and a pickup mechanism that picks up the original documents one by one with a feed roller and a retard roller.

The image recording device 20 is an example of an image forming unit that forms an image on the recording material, and is also an example of a printing mechanism forming an image on a paper sheet. The image recording device 20 is a printer that is based on an electrophotographic system.

The image recording device 20 charges a photoconductor drum with electric charge, and exposes the charged photoconductor drum to a light beam that is controlled in accordance with image information. An electrostatic latent image is thus formed on the photoconductor drum. A developing device develops a visible image from the electrostatic latent image with toner. A fixing device then fixes the resulting toner image to a paper sheet by applying heat and pressure onto the paper sheet having the toner image thereon. The paper sheet having the toner image is discharged into paper trays 11 and 12.

The image recording device 20 is not limited to an electrophotographic system type. The image recording device 20 may be an ink-jet system type which forms an image by ejecting ink onto a paper sheet.

The user interface 30 is a touch panel, for example. The user interface 30 including a touch panel displays a variety of information such as an image forming condition of the image forming apparatus 1. The user may perform an input operation to input the image forming condition by touching the touch panel.

The touch panel includes a backlight, and increases visibility to the user with the backlight turned on.

The human detection sensor 40 detects a person approaching the image forming apparatus 1.

The image forming apparatus 1 operates in one of plural power modes (operation modes) different in terms of power consumption. The power modes include a standard mode in which the image recording device 20 forms an image when a job instruction is provided, a standby mode in which the image recording device 20 waits on standby for a job instruction, and a sleep mode in which the image recording device 20 stays in a power-saving mode. During the sleep mode, the consumed power is reduced by suspending power supplying to the image recording device 20 and the like.

The image forming apparatus 1 shifts from the standard mode to the standby mode when the image recording device 20 has completed the image forming operation. If no new job instruction is provided when a predetermined time has elapsed since the shifting to the standby mode, the image forming apparatus 1 shifts to the sleep mode.

When a predetermined resume condition is satisfied, the image forming apparatus 1 shifts back to the standard mode from the sleep mode. The resume condition may be that the control device 100 receives a job instruction. In the exemplary embodiment, the resume condition is that the human detection sensor 40 has detected a person.

In accordance with the exemplary embodiment, the human detection sensor 40 includes a pyroelectric sensor 41 and a reflective sensor 42. The pyroelectric sensor 41 remains powered even in the sleep mode, and detects any person who enters a predetermined detection area. The reflective sensor 42 is powered with the pyroelectric sensor 41 having detected the entrance of a person, and detects the presence of a person within a predetermined detection area.

The pyroelectric sensor 41 includes a pyroelectric element, a lens, an integrated circuit (IC), and a printed circuit board, and detects an amount of change in infrared light that occurs when a person moves. When a detected amount of change exceeds a predetermined standard value, the pyroelectric sensor 41 detects the entrance of a person.

The reflective sensor 42 includes an infrared emitting diode and a light-receiving photodiode. When a person enters the detection area, an infrared light beam emitted by the infrared emitting diode hits and is partially reflected from the person. The reflected light beam is incident on the photodiode. Based on a voltage output from the photodiode, the reflective sensor 42 determines whether a person is present.

The detection area of the pyroelectric sensor 41 is set to be wider than the detection area of the reflective sensor 42. The pyroelectric sensor 41 consumes power less than the reflective sensor 42. In accordance with the exemplary embodiment, the pyroelectric sensor 41 remains powered in the sleep mode, and when the pyroelectric sensor 41 detects a person, the reflective sensor 42 is powered on. If the reflective sensor 42 detects a person within a predetermined period of time from the time the pyroelectric sensor 41 detected the person, the image forming apparatus 1 shifts back to the standard mode from the sleep mode. If the reflective sensor 42 detects no person within the predetermined period of time, the reflective sensor 42 is powered off.

The image forming apparatus 1 of the exemplary embodiment thus operates in low power consumption in comparison with an apparatus in which the reflective sensor 42 continuously remains powered on in the sleep mode.

The image forming apparatus 1 of the exemplary embodiment enjoys a lower possibility of erratic detection than an apparatus that shifts back from the sleep mode and resumes the standard mode in response to the detection of a person by the pyroelectric sensor 41. The erratic detection may be triggered by a person who is not going to use the image forming apparatus 1 or a dog.

The image forming apparatus 1 of the exemplary embodiment detects at a higher precision a person who intends to use the image forming apparatus 1 and shifts back from the sleep mode.

The camera 50 is an example of an imaging unit that captures an image, and photographs the surroundings of the image forming apparatus 1. Particularly, the camera 50 is intended to photograph a person in the vicinity of the image forming apparatus 1. The camera 50 includes an optical system that focuses the image of the surroundings of the image forming apparatus 1, and an image sensor that detects the image focused by the optical system. The optical system includes a combination of one or more lenses. The image sensor includes a charge-coupled device (CCD) or an array of imaging elements, such as or complementary metal oxide semiconductors (CMOSs). The camera 50 captures at least one of a still image and a moving image.

The microphone 60 picks up a sound in the surroundings of the image forming apparatus 1. Particularly, the microphone 60 picks up the voice of the user who uses the image forming apparatus 1. The microphone 60 is not limited to any particular type. For example, the microphone 60 may be any of the currently available microphones, including a dynamic microphone or a capacitor microphone. The microphone 60 is desirably an omnidirectional micro-electromechanical system (MEMS) microphone.

The loudspeaker 70 outputs a sound in the surroundings of the image forming apparatus 1. The loudspeaker 70 provides voice guidance to the user of the image forming apparatus 1. The loudspeaker 70 also triggers a beep to the user of the image forming apparatus 1. The sound output by the loudspeaker 70 is prepared as audio data. For example, the loudspeaker 70 reproduces the sound in response to the audio data in view of the status of the image forming apparatus 1 and the operation performed by the user.

The information exchanging unit 80 exchanges information with the drone 2 returned to the landing pad unit 110. The information exchanging unit 80 is connected to the drone 2 via a radio communication network and thus communicates with the drone 2 via the radio communication network. The information exchanging unit 80 desirably exchanges information via the near-field radio communication. More specifically, the near-field communication (NFC) or Bluetooth (registered trademark) may be used. The information exchanging unit 80 may communicate with the drone 2 not only via the radio communication network but also via a wired communication network. The information exchanging unit 80 may communicate with the drone 2 via the wired communication network alone. In such a case, the information exchanging unit 80 and an information exchanging unit 230 of the drone 2 may be connectors or the like, and the image forming apparatus 1 communicates with the drone 2 with the connectors mated with each other.

The power source unit 90 supplies the drone 2 with power. If the drone 2 flies using electric power, the power source unit 90 supplies electric power to the drone 2. The power source unit 90 then works as a charger.

The power source unit 90 supplies electric power to the drone 2 via wireless power transmission (contactless power transmission). The wireless power transmission is not limited to any particular type. For example, an inductive coupling system complying with Qi Standard or an electric coupling system may be used.

The power source unit 90 is not limited to the wireless power transmission system. The power source unit 90 may supply electric power via contact type power transmission. In such a case, the power source unit 90 supplies electric power using charging terminals. The charging terminals may be an example of a power supply structure that supplies electric power from the power source unit 90 as a power energy source.

The power energy source is not limited to electric power. If the drone 2 is operated by an internal combustion engine, the power energy source may be fuel that drives the internal combustion engine. The fuels may include ethanol, hydrogen, gasoline, or the like, and may be in the form of liquid or gas.

The drone 2 includes a propeller 210, and an electric motor 220 that is connected to the propeller 210 to rotate the propeller 210. The drone 2 also includes an information exchanging unit 230 that exchanges information with the information exchanging unit 80 in the image forming apparatus 1, a power source receiving unit 240 that receives electric power from the power source unit 90 in the image forming apparatus 1, and a power storage unit 250 that stores a power energy source. The drone 2 further includes a sensor group 260 that acquires a variety of information during a flight, and a controller 270 that controls the process of the entire drone 2.

The drone 2 includes four propellers 210 and four electric motors 220, for example. The drone 2 flies in the air by means of lift that is caused by the propellers 210 driven by the electric motors 220. The drone 2 performs posture control by finely adjusting the number of rotations of each of the four propellers 210. In this way, the drone 2 stably flies in the air and changes the direction of flight. To cause the drone 2 to land on or lift off from the landing pad unit 110, the number of rotations of the propellers 210 is controlled to increase or decrease the lift. More specifically, to cause the drone 2 to land on the landing pad unit 110, the number of rotations of each propeller 210 is decreased to reduce the lift. To cause the drone 2 to lift off from the landing pad unit 110, the number of rotations of each propeller 210 is increased to increase the lift. These control operations are performed by the controller 270.

The information exchanging unit 230 exchanges information with the information exchanging unit 80 in the image forming apparatus 1. The information exchanging unit 230 is not limited to any particular type as long as the information exchanging unit 230 communicates with the information exchanging unit 80 in communication complying with a standard identical to the standard with which the information exchanging unit 80 complies. The near-field radio communication described above may be used.

The information exchanging unit 230 is disposed in the drone 2 in a manner such that the information exchanging unit 230 faces the information exchanging unit 80 when the drone 2 lands on the landing pad unit 110 in the image forming apparatus 1.

The power source receiving unit 240 receives a power energy source from the power source unit 90 in the image forming apparatus 1. The power energy source is different depending on the operation method of the drone 2. Since the drone 2 uses the electric motor 220, the power energy source is electric power.

The power source receiving unit 240 is disposed in the drone 2 in a manner such that the power source receiving unit 240 faces the power source unit 90 when the drone 2 lands on the landing pad unit 110 in the image forming apparatus 1.

The power storage unit 250 stores the power energy source received from the power source receiving unit 240. If the power energy source is electric power, the power storage unit 250 is a battery. If the power energy source is a fuel, the power storage unit 250 is a fuel tank.

The sensor group 260 acquires a variety of information during the flight of the drone 2.

The sensor group 260 may be selected depending on the type of desired information, and then mounted on the drone 2. More specifically, the sensor group 260 includes a camera. The drone 2 thus captures an image during a flight. The image may be a still image or a moving image. The sensor group 260 may further include a microphone. The drone 2 thus picks up a sound during a flight. The sensor group 260 may also include a thermometer or a hygrometer. In this way, the drone 2 monitors indoor temperature or humidity in an office or other indoor space. For example, the sensor group 260 may include an illuminometer. The drone 2 thus monitors illumination in an office or other indoor space. The sensor group 260 may acquire other information related to odor or carbon dioxide concentration ($CO_2$).

The drone 2 is not limited to the type described above. For example, the drone 2 may be in the configuration of a standard helicopter, or a balloon.

If the drone 2 is in the form of a balloon, the balloon is filled with a gas, such as helium, to cause lift. The drone 2 is then lifted in the air. A propeller additionally mounted for movement is rotated. The propeller is horizontally aligned to generate thrust in a horizontal direction. The drone 2 thus moves horizontally. The direction of the flight of the drone 2 is changed by changing the direction of the propeller. To cause the drone 2 to return to the landing pad unit 110, the gas is discharged to decrease lift. To lift the drone 2 from the landing pad unit 110, the balloon is filled with the gas to increase lift. In this case, the image forming apparatus 1 may additionally include a gas feeder to fill the balloon with the gas to lift the drone 2.

The control device 100 is described below.

Figure 2:
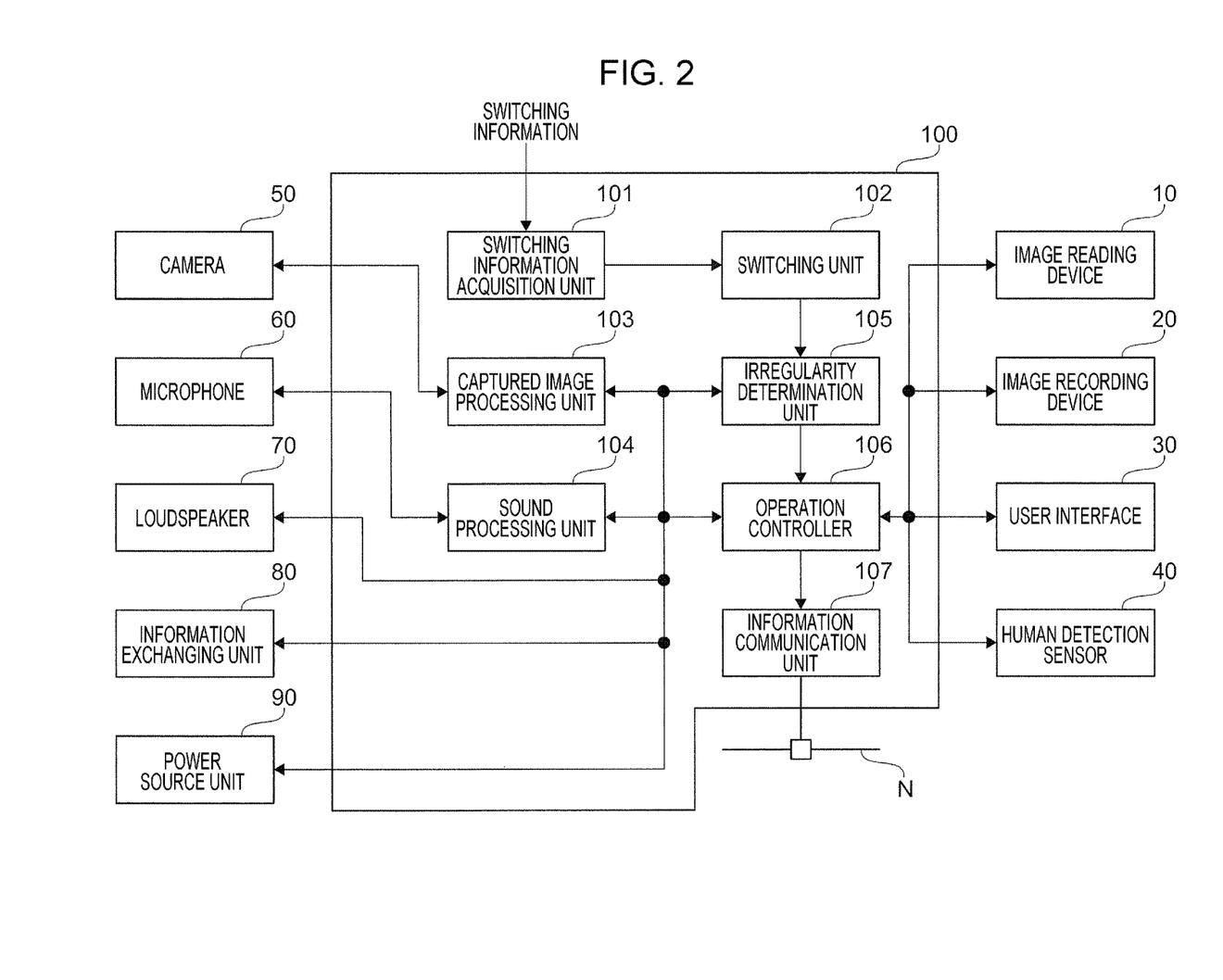
FIG. 2 is a block diagram illustrating a functional configuration of a control apparatus.

FIG. 2 is a block diagram illustrating a functional configuration of the control device 100. FIG. 2 illustrates functions related to the exemplary embodiment from among a variety of functions implemented by the control device 100.

Referring to FIG. 2, the control device 100 of the exemplary embodiment includes a switching information acquisition unit 101, a switching unit 102, a captured image processing unit 103, a sound processing unit 104, an irregularity determination unit 105, an operation controller 106, and an information communication unit 107.

In accordance with the exemplary embodiment, the image forming apparatus 1 operates in a standard status in which the elements in the image recording device 20 and other devices in the image forming apparatus 1 work in a standard operation, and a monitoring status in which the image recording device 20 and other devices detect an irregularity in a predetermined monitoring area. More specifically, in the exemplary embodiment, the image forming apparatus 1 works as a monitoring apparatus in the monitoring status.

The switching information acquisition unit 101 acquires switching information to switch the image forming apparatus 1 between the standard status and the monitoring status.

The switching information relates to illumination of the surroundings of the image forming apparatus 1, for example. If the surroundings of the image forming apparatus 1 are bright and higher in illumination, lighting devices may be in a lighting state. In such a case, the image forming apparatus 1 is desirably in the standard status to form an image. If the surroundings of the image forming apparatus 1 are dark and lower in illumination, the lighting devices may be in an extinguished state. In such a case, it is less likely that the image forming apparatus 1 performs a standard operation, such as image forming, and the image forming apparatus 1 is desirably in the monitoring status to detect an irregularity in the predetermined monitoring area. The switching information acquisition unit 101 acquires information related to illumination from the illuminometer (not illustrated). The illuminometer works as an illumination detector to detect illumination in the monitoring area.

The switching information is not limited to the information related to illumination. The user may switch the image forming apparatus 1 between the standard status and the monitoring status by operating the user interface 30. For example, the user may switch the image forming apparatus 1 from the standard status to the monitoring status by pressing a switching and start button for starting the monitoring status. The user may switch the image forming apparatus 1 from the monitoring status to the standard status by inputting a security code. In such a case, the switching information is configuration information input on the user interface 30. The face of the user may be authenticated using the camera 50 to shift the image forming apparatus 1 from the monitoring status to the standard status.

The switching between the standard status and the monitoring status may be performed according time and date. For example, the image forming apparatus 1 may be set to be in the standard status during daytime of the weekdays, and may be set to be in the monitoring status during nighttime of the weekdays, or during the holidays. In such a case, the switching information is time and date information.

The switching information may be related to an illumination switch in the monitoring area or may be related to whether a door of the monitoring area is locked or not. If the illumination switch is turned on, the image forming apparatus 1 is set to be in the standard status. If the illumination switch is turned off, the image forming apparatus 1 is set to be in the monitoring status. If the door is not locked, the image forming apparatus 1 is set to be in the standard status. If the door is locked, the image forming apparatus 1 is set to be in the monitoring status.

The monitoring area is an area monitored by the image forming apparatus 1 when the image forming apparatus 1 works as a monitoring apparatus. The monitoring area may be a detection area of the human detection sensor 40 or an imaging area of the camera 50. The monitoring area may be the inside space of a room where the image forming apparatus 1 is installed.

The switching unit 102 switches the image forming apparatus 1 between the standard status and the monitoring status. The switching unit 102 switches the operation of the image forming apparatus 1 in accordance with the switching information, such as illumination, acquired by the switching information acquisition unit 101.

The captured image processing unit 103 processes the image photographed by the camera 50. In the standard status, the camera 50 photographs the face of the user who uses the image forming apparatus 1. The captured image processing unit 103 recognizes the user in accordance with the image photographed by the camera 50. The recognition of the user means authentication of the user. To authenticate the user, an image of the face of the user is recorded in advance as image data, and the captured image processing unit 103 checks the image photographed by the camera 50 against the recorded image of the face. The recognition of the user may also mean the detection of the user. If the image of the face of a person is photographed by the camera 50, the captured image processing unit 103 determines that the user who is in front of the image forming apparatus 1 and uses the image forming apparatus 1 is detected.

In the monitoring status, the camera 50 may photograph an unscrupulous person entering the monitoring area. The captured image processing unit 103 then stores the data of the photographed image. Since the image forming apparatus 1 could possibly be damaged by the unscrupulous person, the captured image processing unit 103 may transmit the data of the photographed image to an external apparatus via the information communication unit 107 and a communication network N. The camera 50 may also be used to detect an irregularity in the monitoring area in response to the photographed image.

The sound processing unit 104 processes a sound picked up by the microphone 60. If the sound is picked up by the microphone 60 in the standard status, the sound processing unit 104 authenticates the user in response to the sound picked up by the microphone 60. For example, a power spectrum that indicates the relationship between the frequency and the magnitude of the user's voice may be recorded in advance, and the sound processing unit 104 may check the power spectrum of the voice picked up by the microphone 60 against the recorded power spectrum.

Using the microphone 60, the user may set an image forming condition in the image recording device 20 or may cause the image recording device 20 to start operating by giving a voice command (a voice operation command). The voice operation command is registered in a registration dictionary in advance, and the sound processing unit 104 determines the intention of the user by checking the user's voice against the contents of the registration dictionary.

In the monitoring status, the microphone 60 picks up a sound in the monitoring area. The irregularity determination unit 105 described below uses the sound picked up by the microphone 60 to detect an irregularity within the monitoring area. In the monitoring status, the sound processing unit 104 processes the sound in response to an irregularity determination process of the irregularity determination unit 105. For example, the sound processing unit 104 generates a power spectrum of the sound, and amplifies a sound signal.

In the monitoring status, the irregularity determination unit 105 determines whether an irregularity has occurred in the monitoring area. In accordance with the exemplary embodiment, for example, the irregularity determination unit 105 references the sound picked up by the microphone 60 to determine whether an irregularity has occurred in the monitoring area.

More specifically, if the microphone 60 picks up a sound that has not been registered in the registration dictionary, the irregularity determination unit 105 determines that an irregularity has occurred. If the sound picked up by the microphone 60 is above a predetermined volume level, the irregularity determination unit 105 determines that an irregularity has occurred. Furthermore, if the microphone 60 picks up sounds in excess of a predetermined frequency of occurrences, the irregularity determination unit 105 determines that an irregularity has occurred. The irregularity determination unit 105 may analyze the frequency of the sound picked up by the microphone 60 to determine whether an irregularity has occurred. For example, if the sound is a scream, the frequency distribution thereof has a characteristic feature. The irregularity determination unit 105 analyzes the sound and then determines that the sound picked up by the microphone 60 is a scream. An extraordinary noise that is caused when an irregularity occurs, such as a sound of door opening, or a sound of window glass breaking, may be registered in the registration dictionary. If the sound picked up by the microphone 60 matches the registered extraordinary sound, the irregularity determination unit 105 determines that an irregularity has occurred. With plural microphones 60 installed, the irregularity determination unit 105 may determine a distance and direction to the source of the sound. The irregularity determination unit 105 determines whether the source of the sound is present within the monitoring area. If the source of the sound is present within the monitoring area, the irregularity determination unit 105 determines that an irregularity has occurred. If the source of the sound is outside the monitoring area, the irregularity determination unit 105 determines that no irregularity has occurred.

The irregularity determination unit 105 may use a detection signal from the pyroelectric sensor 41 or an image photographed by the camera 50 to determine whether an irregularity has occurred. If the pyroelectric sensor 41 has detected a person, the irregularity determination unit 105 determines that an irregularity has occurred. If a person is present within the image photographed by the camera 50, the irregularity determination unit 105 determines that an irregularity has occurred. In other words, the irregularity determination unit 105 determines that an unscrupulous person has entered the monitoring area.

The operation controller 106 controls operations of the image reading device 10, the image recording device 20, the user interface 30, the human detection sensor 40, the camera 50, the microphone 60, the loudspeaker 70, the information exchanging unit 80, and the power source unit 90. In each of the standard status and the monitoring status, the operation controller 106 determines and controls the operations of the image reading device 10, the image recording device 20, the user interface 30, the human detection sensor 40, the camera 50, the microphone 60, the loudspeaker 70, the information exchanging unit 80, and the power source unit 90, in response to information acquired from the user interface 30, the human detection sensor 40, the camera 50, the microphone 60, and the information exchanging unit 80.

The information communication unit 107, connected to the communication network N, transmits and receives signals to and from the communication network N. The network N may be a local area network (LAN), a wide-area network (WAN), or the Internet. The network N may be a public telephone network. The information communication unit 107 is used to receive a print job transmitted from a personal computer (PC) or the like, connected to the communication network N, and to transmit data of an image of an original document read by the image reading device 10 to an external apparatus.

The image forming apparatus 1 thus constructed operates as described below.

The image forming apparatus 1 operates as described below in the standard status.

In the standard status, the user may make a copy of an original document using the image forming apparatus 1. The user may print out data of a print job from the PC connected to the communication network N by transmitting the print job to the image forming apparatus 1. The user may transmit and receive facsimile data on the image forming apparatus 1 via the communication network N. The user may use the image forming apparatus 1 to scan an original document to store image data of the original document in the image forming apparatus 1 or to store the PC connected to the communication network N.

An example of an operation of the image forming apparatus 1 performed in the standard status is described in detail below. In this operation, the user makes a copy of an original document on the image forming apparatus 1.

When the pyroelectric sensor 41 in the human detection sensor 40 detects a person approaching the image forming apparatus 1 in the sleep mode, the reflective sensor 42 is powered on. If the reflective sensor 42 detects a person within a predetermined period of time, the image forming apparatus 1 determines that the approaching person is a user who is going to use the image forming apparatus 1, and then shifts back to the standard mode from the sleep mode. The camera 50 rather than the reflective sensor 42 may be used to determine that the approaching person is the user who is going to use the image forming apparatus 1.

If the user looks at the camera 50 in the standard mode, the camera 50 photographs the face of the user, and the control device 100 authenticates the user.

If the user speaks to the microphone 60 in the standard mode, the control device 100 authenticates the user, based on the voice picked up by the microphone 60.

The user sets an image forming condition in the image recording device 20 using the user interface 30. If a setting includes plural steps, the user may enter a voice command using the microphone 60 in a user assisting fashion. In response, the loudspeaker 70 may output a voice guide in an interactive fashion. If the user makes an error in operation, the loudspeaker 70 may output a voice guide prompting the user to correct the error. The loudspeaker 70 may also output a voice guide to take out a paper sheet if the paper sheet is jammed. The loudspeaker 70 may also be used to output an alert sound to the user, for example, at the end of copying or printing, or when a facsimile is received. The alert sound may be a beep sound, a melody, or a voice.

When the user places original documents on an automatic document feeder of the image reading device 10 and presses a start key on the user interface 30, the automatic document feeder transports the original documents onto a platen glass of the reading unit one by one. The reading unit then reads the image of each document. The image data of the read original document is transmitted to the image recording device 20. The image recording device 20 performs a predetermined image processing operation on the image data, and then forms an image on a paper sheet in response to the image data.

The image forming apparatus 1 performs an operation on the drone 2 as described below.

Figure 3:
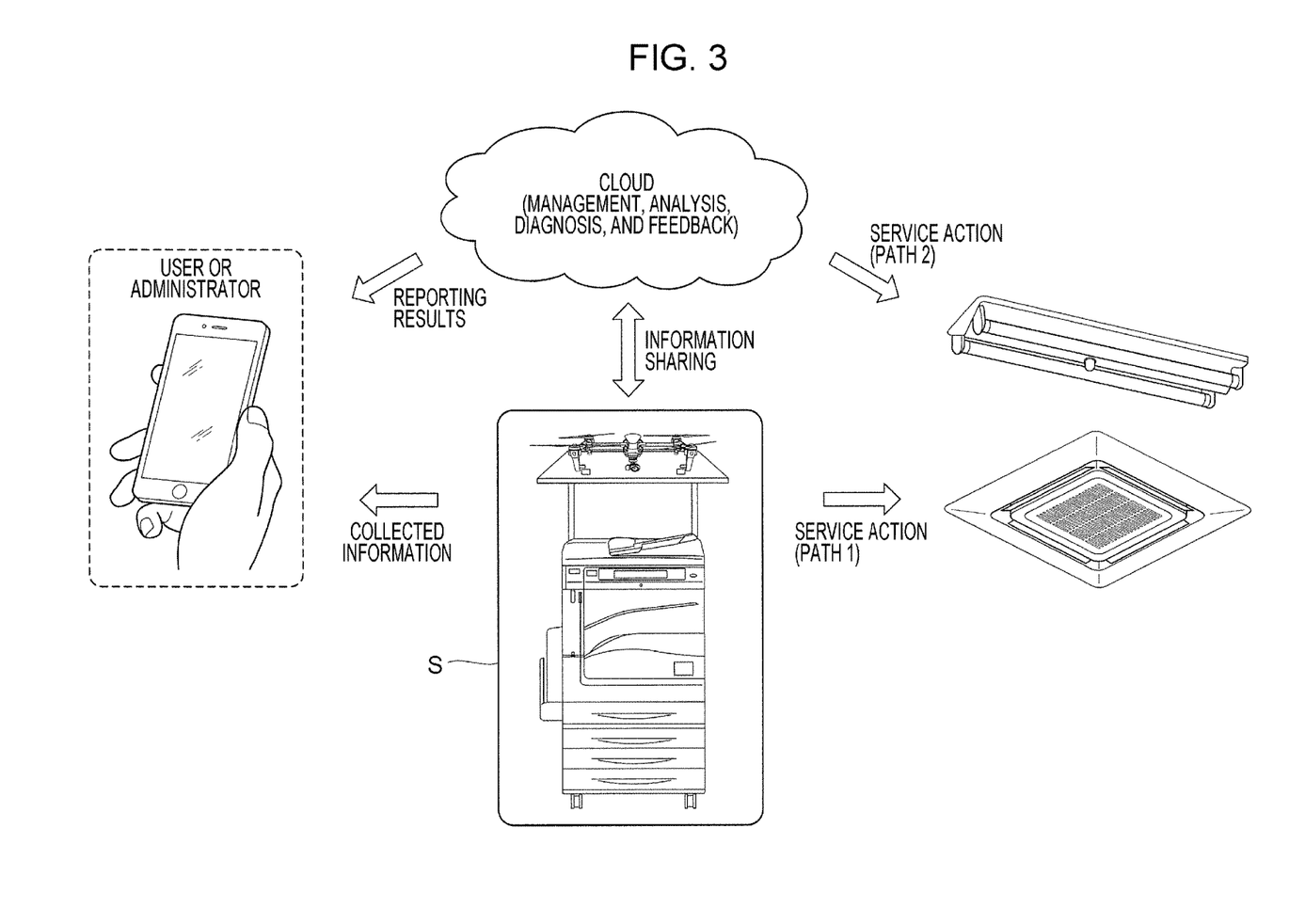
FIG. 3 illustrates how to use a drone in the image forming system of the exemplary embodiment.

FIG. 3 illustrates how to use the drone 2 in the image forming system S of the exemplary embodiment.

In the exemplary embodiment, the drone 2 typically files indoor space. The term indoor space may be an office, a plant, a shopping center, or a railway station. The drone 2 may partially fly outdoors, for example, when the drone 2 moves from one building to another.

In the standard status, the drone 2 acquires and collects indoor information via the sensor group 260. More specifically, the information may be information related to an image, sound, temperature, humidity, illumination, odor, carbon dioxide concentration, or the like. The information may be received and collected via the near-field radio communication, such as Bluetooth, using the information exchanging unit 80.

The drone 2 returns back to the landing pad unit 110 in the image forming apparatus 1 after completing a flight along a planned flight path or when remaining power stored in the power storage unit 250 becomes insufficient. The image forming apparatus 1 may unconditionally force the drone 2 to return to the landing pad unit 110. Alternatively, the image forming apparatus 1 may permit the drone 2 to return after identifying the drone 2 by identification information (ID) thereof. This operation may be performed when the information exchanging unit 230 in the drone 2 transmits the identification information to the information exchanging unit 80 in the image forming apparatus 1. The information exchanging unit 80 thus works as an identification information recognition unit that recognizes the identification information of the drone 2 in flight. In response to the identification information, the operation controller 106 performs a determination operation as to whether to cause the drone 2 to return. The operation controller 106 may also determine whether to exchange information described below or whether to supply power. In this case, the operation controller 106 works as a determination unit. In response to the identification information recognized by the information exchanging unit 80, the operation controller 106 serving as the determination unit determines whether to permit the drone 2 to return to the landing pad unit 110 or whether to permit the image forming apparatus 1 to communicate with the drone 2 and/or to supply power to the drone 2.

When the drone 2 returns to the landing pad unit 110, the image forming apparatus 1 recognizes that the drone 2 is in a landed state. For example, the image forming apparatus 1 recognizes the drone 2 in a landed state when the information exchanging unit 230 in the drone 2 transmits to the information exchanging unit 80 in the image forming apparatus 1 information indicating that the drone 2 has returned to the landing pad unit 110. In this case, the information exchanging unit 80 works as a recognition unit that recognizes that the drone 2 is in a landed state on the landing pad unit 110.

The power source unit 90 in the image forming apparatus 1 starts supplying power, such as electric power, to the power source receiving unit 240 in the drone 2. The drone 2 stores power received by the power source receiving unit 240 into the power storage unit 250.

Through the information exchanging unit 230 in the drone 2, the information exchanging unit 80 in the image forming apparatus 1 acquires the information the drone 2 has collected during the flight.

The operation controller 106 in the image forming apparatus 1 stores indoor information acquired from the drone 2.

The indoor information acquired from the drone 2 may be output from the image forming apparatus 1 to the outside via the communication network N. For example, the indoor information may be output to a management server that is configured to manage the indoor information. For example, the indoor information may be output via the Internet to a cloud server that is configured to perform cloud service. For simplicity, the cloud server is represented by the term "cloud" in FIG. 3. The operation controller 106 outputs the indoor information via the information communication unit 107. The information communication unit 107 works as a communication unit that performs communication via the communication network N. The operation controller 106 works as a communication controller that exchanges information with the drone 2 landed on the landing pad unit 110 via the information communication unit 107 and the Internet.

The management server or the cloud server, as an output destination, manages, analyzes, diagnoses, and feeds back the indoor information. For example, the management server or the cloud server acquires information concerning the presence or absence of a person present indoors on the basis of the image from the camera 50. In this way, the user may learn whether each employee has come to work as scheduled in accordance with attendance information, whether each employee is sitting at his or her desk, the flow line of each employee, and how many employees still stay in an overtime time band.

Air conditioning may also be controlled in accordance with temperature or humidity information. Control operation may be performed in accordance with illumination information to open or close a curtain, to light or extinguish a light. A ventilation device, or an air agitation device may be controlled in accordance with information related to odor or carbon dioxide concentration. FIG. 3 illustrates these operations represented by a service action (path 2). These operations may also be performed by the image forming apparatus 1 in place of the management server or the cloud server. FIG. 3 illustrates the operations, performed by the image forming apparatus 1, represented by a service action (path 1).

The management server or the cloud server may determine the flight path of the drone 2 in accordance with the indoor information. For example, a user may request the management server or the cloud server to check whether a person that the user desires to communicate with is sitting at his or her desk. The flight path may be decided in view of this request. The management server or the cloud server may determine which sensor of the sensor group 260 to use, or the operating condition of the sensor group 260. The operating condition of the sensor group 260 is a photographing direction or a zoom magnification of the camera. These pieces of information are configuration information to fly the drone 2, and are transmitted from the information exchanging unit 80 to the drone 2.

The management server or the cloud server may report analysis results or service action results to the user or administrator. The collected indoor information may be transmitted to the user or administrator.

When the supplying of power and exchanging of information are complete, the drone 2 lifts off from the landing pad unit 110 for another flight. The drone 2 may receive information the drone 2 is going to transmit or may receive a paper sheet having an image related to the information and formed by the image recording device 20. The information the drone 2 is going to transmit may be information that is to be notified to people in indoor space. Such information may include an urgent notice in an office, a work schedule in a plant, sales information in a shopping center, or delay information of trains in a railway station. The drone 2 may include a display, such as a liquid-crystal display, and flies in the air while displaying such information on the display. In order to receive the paper sheet having the image related to the information, the drone 2 may include a holding unit, such as a gripper or actuator, which grips the paper sheet. The drone 2 flies in the air with the paper sheet held by the holding unit. For the drone 2 to receive the information, that information is transmitted from the information exchanging unit 80 in the image forming apparatus 1. For the drone 2 to receive the paper sheet, the paper sheet is picked up from the paper tray 11 or 12. The information exchanging unit 80 and the paper trays 11 and 12 are an example of a delivery unit.

The drone 2 not only transmits information, but also delivers information or a paper sheet. The drone 2 may deliver stationary writing materials, or even a battery.

The flight path of the drone 2 may be predetermined. Alternatively, the user may remote control the drone 2. In such a case, the user may transmit operation information to the drone 2 via a network and the image forming apparatus 1. For example, the information communication unit 107 receives the operation information, and the operation controller 106 transmits to the drone 2 a control signal from the information exchanging unit 80 in response to the operation information. In this case, the operation controller 106 works as a flying device controller that controls the drone 2 in response to the information acquired via the information communication unit 107.

In the above discussion, the single drone 2 is used. The exemplary embodiment is not limited to the single drone but may include plural drones 2. The exemplary embodiment is not limited to the single image forming apparatus 1 but may include plural image forming apparatuses 1.

In the image forming system S, the drone 2 collects a variety of information during an indoor flight, and then the image forming apparatus 1 acquires the information. The information may be analyzed by the management server or the cloud server through the communication network N or the Internet. The analysis results may be used to provide a variety of services, including controlling indoor facilities, or transmitting information. The image forming apparatus 1 is typically installed in an office. To supplement power or to exchange information with the drone 2 in a landed state, there is no much need to additionally install a new facility. Accordingly, a new location for the new facility is not needed. A power supply unit of the image forming apparatus 1 and information communication function of the image forming apparatus 1 may be used to supplement power to or to exchange information with the drone 2. There is less need for a new power line and communication wiring.

The process of the image forming apparatus 1 in the monitoring status is described below.

The functions of the image reading device 10, the image recording device 20, the user interface 30, the human detection sensor 40, the camera 50, the microphone 60, and the loudspeaker 70 are used to cause the image forming apparatus 1 to work as a monitoring apparatus in the exemplary embodiment.

Figure 4:
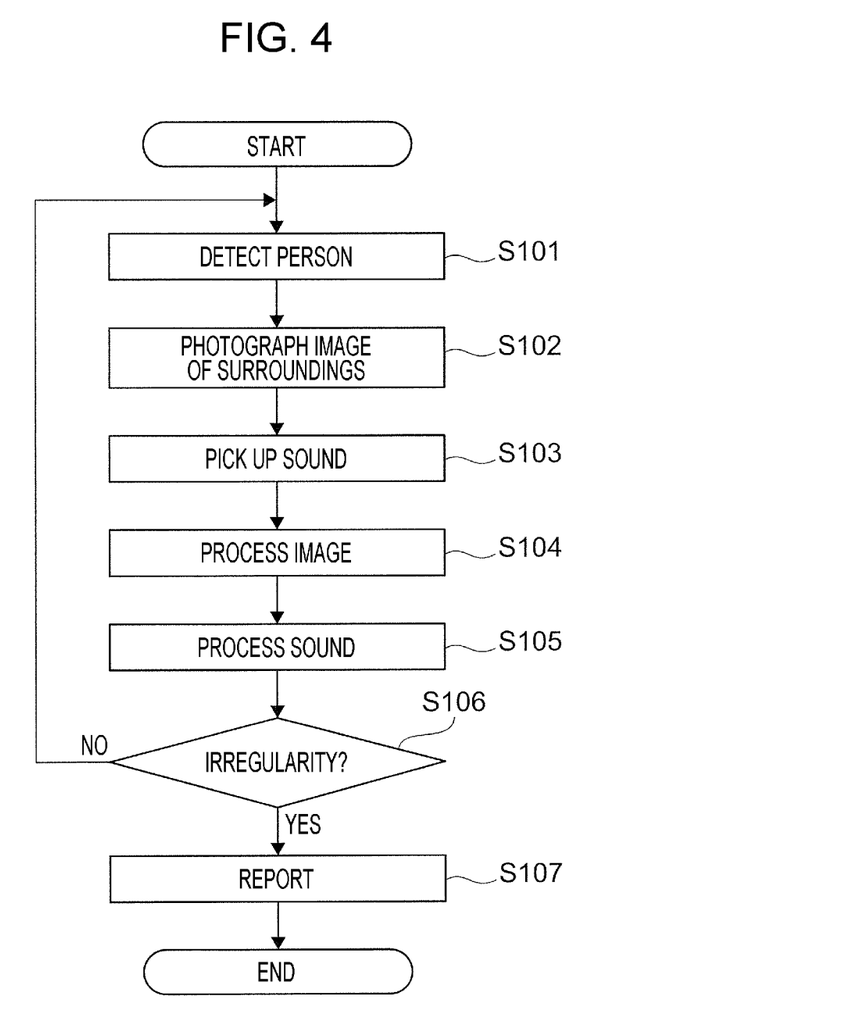
FIG. 4 is a flowchart illustrating a process of an image forming apparatus that is in a monitoring status.

FIG. 4 is a flowchart illustrating the process of the image forming apparatus 1 that is in the monitoring status.

The image forming apparatus 1 in the monitoring status detects a person entering the detection area with the pyroelectric sensor 41 of the human detection sensor 40 (step S101). The camera 50 photographs the surroundings of the image forming apparatus 1 (step S102). In this case, the camera 50 is enabled to photograph even in the monitoring status. The microphone 60 picks up a sound (step S103).

The captured image processing unit 103 processes the image photographed by the camera 50 (step S104). The sound processing unit 104 processes the sound picked up by the microphone 60 (step S105).

The irregularity determination unit 105 references the detection signal from the pyroelectric sensor 41, the image photographed by the camera 50, and the sound picked up by the microphone 60 to determine whether an irregularity has occurred (step S106).

If the irregularity determination unit 105 determines that no irregularity has occurred (no branch from step S106), processing returns to step S101.

If the irregularity determination unit 105 determines that an irregularity has occurred (yes branch from step S106), the operation controller 106 operates the image reading device 10, the image recording device 20, the user interface 30, the human detection sensor 40, the camera 50, the microphone 60, and the loudspeaker 70 in a predetermined operation. The predetermined operation may include outputting an indication that an irregularity has occurred. More specifically, the information communication unit 107 outputs the notification of the irregularity to the outside from the image forming apparatus 1 using the communication network N (step S107). Also, a light within the monitoring area may be lit. Additionally, the image photographed by the camera 50 or the sound picked up by the microphone 60 may be stored.

In the exemplary embodiment, the human detection sensor 40, the camera 50, and the microphone 60 work as a detector that detects an irregularity. It is sufficient if at least one of these sensors operates as a detector, and all the sensors do not necessarily have to operate.

The process that the image forming apparatus 1 performs on the drone 2 is approximately identical to the process performed in the standard status. Note however that the management server or the cloud server configured to analyze the indoor information acquired from the drone 2 determines whether an irregularity has occurred. Alternatively, the drone 2 may be caused to perform this function. If an irregularity has occurred, the information exchanging unit 230 in the drone 2 may notify the information exchanging unit 80 in the image forming apparatus 1 that an irregularity has occurred.

In the image forming system S, the devices originally available in the image forming apparatus 1 are efficiently used to provide the function of a monitoring apparatus to the image forming apparatus 1. In other words, the detectors described above are used when the image recording apparatus 20 forms an image in the standard operation thereof. The detectors are thus directly used.

If the drone 2 is used together with the image forming apparatus 1, the image forming system S monitors an area beyond the monitoring area of the image forming apparatus 1. The drone 2 working as a monitoring device supplements the image forming apparatus 1.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A multifunction printer, comprising:
    a printer configured to form an image on a recording material;
    a landing pad configured for an unmanned flying device to land on after a flight of the unmanned flying device; and
    a first communicator configured to exchange information with the unmanned flying device landed on the landing pad,
    wherein the multifunction printer has a monitoring status in which the multifunction printer monitors an area.

2. The multifunction printer according to claim 1, wherein the first communicator is further configured to exchange information via near-field radio communication.

3. The multifunction printer according to claim 1, wherein the first communicator is further configured to acquire indoor information collected by the unmanned flying device from the unmanned flying device having landed on the landing pad.

4. The multifunction printer according to claim 2, wherein the first communicator is further configured to acquire indoor information collected by the unmanned flying device from the unmanned flying device having landed on the landing pad.

5. The multifunction printer according to claim 3, wherein the first communicator is further configured to acquire the indoor information that the unmanned flying device has collected via near-field radio communication during the flight.

6. The multifunction printer according to claim 4, wherein the first communicator is further configured to acquire the indoor information that the unmanned flying device has collected via near-field radio communication during the flight.

7. The multifunction printer according to claim 1, wherein the first communicator is further configured to acquire information related to at least one of an image, sound, odor, temperature, and humidity.

8. The multifunction printer according to claim 2, wherein the first communicator is further configured to acquire information related to at least one of an image, sound, odor, temperature, and humidity.

9. The multifunction printer according to claim 3, wherein the first communicator is further configured to acquire information related to at least one of an image, sound, odor, temperature, and humidity.

10. The multifunction printer according to claim 4, wherein the first communicator is further configured to acquire information related to at least one of an image, sound, odor, temperature, and humidity.

11. The multifunction printer according to claim 5, wherein the first communicator is further configured to acquire information related to at least one of an image, sound, odor, temperature, and humidity.

12. The multifunction printer according to claim 6, wherein the first communicator is further configured to acquire information related to at least one of an image, sound, odor, temperature, and humidity.

13. The multifunction printer according to claim 1, wherein the first communicator is further configured to acquire, from the unmanned flying device, information as to whether or not a person is present indoors.

14. The multifunction printer according to claim 2, wherein the first communicator is further configured to acquire, from the unmanned flying device, information as to whether or not a person is present indoors.

15. The multifunction printer according to claim 1, wherein the first communicator is further configured to transmit, to the unmanned flying device, configuration information that is determined in accordance with information received from the unmanned flying device.

16. The multifunction printer according to claim 1, further comprising:
    a second communicator configured to perform communication via a network; and
    a communication controller configured to exchange information with the unmanned flying device through the Internet via the second communicator.

17. The multifunction printer according to claim 16, wherein the second communicator is further configured to acquire image information that the printer uses to form the image.

18. The multifunction printer according to claim 1, further comprising a detector configured to detect an irregularity in a predetermined monitoring area.

19. A multifunction printer system, comprising:
    a multifunction printer; and
    an unmanned flying device configured to exchange information with the multifunction printer, the unmanned flying device exchanging the information when the unmanned flying device lands on the multifunction printer,
    wherein the multifunction printer includes
    a printer configured to form an image on a recording material,
    a landing pad configured for the unmanned flying device to land on after a flight of the unmanned flying device, and
    a communicator configured to exchange information with the unmanned flying device landed on the landing pad, and
    wherein the multifunction printer has a monitoring status in which the multifunction printer monitors an area.

20. A multifunction printer method, comprising:
    forming an image on a recording material using a printer;
    landing an unmanned flying device on a landing pad after a flight of the unmanned flying device;
    exchanging information with the unmanned flying device landed on the landing pad; and
    monitoring, using the multifunction printer, an area when a status of the multifunction printer is a monitoring status.

21. The multifunction printer according to claim 1, wherein the multifunction printer is configured to control the unmanned flying device.

* * * * *